US006667260B2

(12) United States Patent
Kunert et al.

(10) Patent No.: US 6,667,260 B2
(45) **Date of Patent: *Dec. 23, 2003**

(54) GLASS FOR THERMAL SHOCK-RESISTANT BEVERAGE CONTAINERS

(75) Inventors: Christian Kunert, Mainz (DE); Johannes Roettgers, Gau-Algesheim (DE); Roland Leroux, Stadecken-Elsheim (DE); Peter Brix, Mainz (DE)

(73) Assignee: Schott Glas, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/287,596

(22) Filed: Nov. 5, 2002

(65) Prior Publication Data

US 2003/0054937 A1 Mar. 20, 2003

Related U.S. Application Data

(63) Continuation of application No. 09/532,966, filed on Mar. 22, 2000.

(30) Foreign Application Priority Data

Mar. 23, 1999 (DE) ........................................ 199 13 227

(51) Int. Cl.[7] ................................................ C03C 3/091
(52) U.S. Cl. ......................................................... 501/66
(58) Field of Search ............................................ 501/66

(56) References Cited

U.S. PATENT DOCUMENTS 3,216,808 A 11/1965 Bishop et al.
3,984,252 A 10/1976 Kiefer
5,264,400 A * 11/1993 Nakaguchi et al. ........... 501/71
5,288,668 A * 2/1994 Netter ......................... 501/66
5,599,753 A * 2/1997 Watzke et al. ................ 501/66
5,736,476 A * 4/1998 Watzke et al. ................ 501/66
6,177,371 B1 * 1/2001 Havens et al. ................ 501/66

FOREIGN PATENT DOCUMENTS

| | | |
|---|---|---|
| DE | 588643 | 11/1933 |
| DE | 679155 | 7/1939 |
| DE | 195 15 608 C1 | 4/1995 |
| EP | 0 297 255 A2 | 1/1989 |
| EP | 0 839 722 A1 | 5/1998 |
| JP | 64-87529 A | 3/1989 |

OTHER PUBLICATIONS

Derwent WPI Abstract of DE 2419724 (Oct. 30, 1975) A Jenaer Glaswerk Schott.
Derwent API Abstract of JP1087529, Mar. 31, 1989 Toshiba Glass KK.
Search Report for GB 0000695.7 dated Apr. 2000.
Patent Abstracts of Japan—JP1087529 (Mar. 31, 1989) Toshiba Glass Co. Ltd.
French Search Report of corresponding French Application GD/PG/B99/4669 FR. No month.
Horst Scholze, Glass–Nature, Structure and Properties, (1998) translation of p. 222. No month.
Fabrication Faults in the Glass Industry, (1980), translation of pp. 396–397. No month.

* cited by examiner

*Primary Examiner*—Karl Group
(74) *Attorney, Agent, or Firm*—Millen, White, Zelano & Branigan, P.C.

(57) ABSTRACT

The invention relates to a glass having the composition (in % by weight, based on oxide) $SiO_2$ about 78.5-about 79.5, $B_2O_3$ about 13.0-about 14.0, $Al_2O_3$ about 2.0-about 3.0, $Na_2O$ about 4.5-about 5.5, $K_2O$ 0-about 0.6, which may be used in the production of thermal shock-resistant beverage containers, particularly teapots, coffee machine jugs and baby-milk bottles.

12 Claims, No Drawings

GLASS FOR THERMAL SHOCK-RESISTANT BEVERAGE CONTAINERS

This application is a continuation of U.S. patent application Ser. No. 09/532,966 filed Mar. 22, 2000.

FIELD OF THE INVENTION

The invention relates to glass, and more particularly, to a glass that may be used in the production of thermal shock-resistant beverage containers.

BACKGROUND OF THE INVENTION

Glass containers intended for the preparation or storage of hot beverages, such as, for example, coffee machine jugs, teapots and baby-milk bottles, should be made of glasses having high thermal shock resistance, which arises from a low coefficient of thermal expansion and a low modulus of elasticity, and good chemical resistance. Such vessels are therefore made of borosilicate glasses, which may be used for laboratory equipment.

The group of borosilicate glasses has been known for some time. For example, German patent specifications DE 588 643 and DE 679 155 disclose heat-resistant glasses made from $SiO_2$, $Al_2O_3$, $B_2O_3$ and $R_2O$, in particular from (% by weight) ≧80 $SiO_2$, 13 $B_2O_3$, 2 $Al_2O_3$ and 4 $Na_2O$, having a coefficient of expansion $\alpha_{20/300}$ of $\leqq 3.4 \cdot 10^{-6}$/K. Borosilicate glasses for laboratory applications must meet strict requirements and satisfy the DIN ISO 3585 standard on "Borosilicate glass 3.3", i.e., must have, inter alia, a coefficient of linear thermal expansion $\alpha_{20/300}$ of between 3.2 and $3.4 \cdot 10^{-6}$/K.

Owing to their composition, the known glasses which comply with the above standard have very high melting points. In addition, they can only be produced with comparatively low melting capacities. While conventional container glasses based on soda-lime glass are produced in equipment having melting capacities of up to 450 tons of glass per day with maximum temperatures below 1450° C., melting capacities of less than 60 tons of glass per day are usual for borosilicate glasses 3.3 and melting points of at least 1650° C. are necessary. One reason for the low melting capacities is glass melting furnaces for larger throughputs cannot be built since no materials are available for constructing, for example, large domes for the high temperatures. Another reason is that relatively large electric glass melting furnaces cannot guarantee uniform heating. Owing to the smaller equipment and higher melting points, the production of these borosilicate glasses requires significantly more energy than does the production of soda-lime glasses. This, together with the more expensive raw materials for borosilicate glasses, results in higher glass prices for borosilicate glasses 3.3.

Against the background of increasing pressure on industry to save energy and to reduce production costs overall, the use of low-melting-capacity energy-intensive borosilicate glass 3.3 can no longer be justified for products which do not have to satisfy the very strict requirements of laboratory equipment. At the same time, however, the energy saving and productivity increase achieved must not be negated by plant down times during the glass change of production of an alternative glass in the same melting equipment.

SUMMARY OF THE INVENTION

One feature of the invention is, therefore, to find a glass which requires less melting energy, i.e., a glass having low melting and working points, had adequate thermal shock resistance for the production of heat-resistant beverage containers, and has high chemical resistance similar to that of borosilicate glasses 3.3.

This feature can be achieved by using a glass as described herein.

A glass from the narrow composition range (in % by weight, based on oxide) of

| | |
|---|---|
| $SiO_2$ | about 78.5–about 79.5 |
| $B_2O_3$ | about 13.0–about 14.0 |
| $Al_2O_3$ | about 2.0–about 3.0 |
| $Na_2O$ | about 4.5–about 5.5 |
| $K_2O$ | 0–about 0.6 |

Owing to the balanced ratio of the components present, combines properties which were hitherto regarded as uncombinable with one another.

The relatively high $SiO_2$ facilitates the low thermal expansion; at even higher contents, the improved melting properties, expressed by the reduced melting point, would not be achieved.

$Al_2O_3$ in the stated amounts counters phase separation of the glass, which would result in a reduction in the chemical resistance and in haze. At least about 2.0% by weight are desirable for this purpose. Desirably, higher contents than about 3.0% by weight should not be combined with the other requirements of a glass because the melting point may rise to an impermissible extent.

The relatively high content of $Na_2O$ can cause the reduction in the melting point. This action can be reinforced further by a $K_2O$ content of up to about 0.6% by weight.

The narrow range mentioned for the $B_2O_3$ content, together with the alkali metal oxide(s), can produce the low melting point. Higher $B_2O_3$ contents may result in a significant increase in the raw materials costs, which can negate the savings achieved by the lower melting energy requirement. Lower contents are likewise not desirable because this can result in a rise in the melting point. In principle, a lowering of the melting point could be achieved by a further increase in the alkali metal content, but, desirably, the stated upper limits for $Na_2O$ and $K_2O$ are not exceeded in order to satisfy the high demands on chemical resistance. With a lower alkali metal content than the stated lower limit, the lower melting point may not be achieved owing to the restriction in the $B_2O_3$ content.

In order to improve the glass quality, the glass can also contain conventional fining agents, such as $As_2O_3$, $Sb_2O_3$ or chlorides (NaCl, KCl) in conventional amounts, such as from about 0.1 to about 2 weight percent. It is furthermore possible for the glass to contain up to a total of about 0.5% by weight of further oxides, such as, for example, MgO, or CaO oxides which may be introduced into the glass composition via impurities and which have no interfering effect, i.e., do not adversely influence the suitability for the stated use. It is also possible for decolorants, such as, for example, $Er_2O_3$ or CoO, to be included, which counteract or hide the coloring effect of iron which is usually present in the raw materials.

The glass used in accordance with the invention has a working point $V_A$, i.e., the temperature at a viscosity of about $10^4$ dPas, of ≦about 1220° C., and preferably, the working point is within about +/−10° C. of about 1210° C. This temperature is below that of the commercially available borosilicate glass 3.3 having the composition (in % by weight) 80.1 $SiO_2$, 13.0 $B_2O_3$, 2.5 $Al_2O_3$, 3.5 $Na_2O$, 0.6 $K_2O$, 0.3 NaCl (See Comparative Example V described hereinafter) with a working point $V_A$ of 1250° C. The improvement is even clearer on comparison of the temperatures at a viscosity of $10^3$ dPas (T3), which is of greater relevance for melting of the glass. For the glass according to the invention, this temperature is at most about 1460° C., while it is 1530° C. for Comparative Example V.

The figures document the ease of melting of the glass. It enables the maximum melting point to be lowered by about 30° C. in industrial melting units with a simultaneous increase in the production capacity by about 10%, in each case compared with V of Example 1.

It is known that the chemical resistance, in particular the hydrolytic and acid resistance, is impaired for a glass whose composition is varied by reducing the $SiO_2$ content and increasing the alkali metal content so that the glass becomes "softer", i.e., its melting point is reduced.

Surprisingly, this was not the case in the present invention. Instead, the chemical resistance of the glass is very high. The glass has both a hydrolytic resistance H in accordance with DIN ISO 719 in hydrolytic class 1 and an acid resistance S in accordance with DIN 12 116 in acid class 1. Its caustic lye resistance L in accordance with DIN ISO 659, in lye class 2, is just as good as for borosilicate glass 3.3. This is particularly surprising inasmuch as the glass, compared with the glass V of Example 1, contains more $Na_2O$, which is known for its disadvantageous effect on the chemical resistance, and no additional components, such as, for example, CaO, for improving the hydrolytic and acid resistance.

The glass has a coefficient of linear thermal expansion $\alpha_{20/300}$ of between about 3.5 and about $3.7 \cdot 10^{-6}$/K and a modulus of elasticity E of ≦ about 65 GPa. Preferably, the modulus of elasticity is as low as possible, such as below about 65 GPa. With these properties, the glass has a low specific thermal stress $\phi$, which is given by $\phi=(E \cdot \alpha)/(1-\mu)$, where $\mu$ is the Poisson number, which hardly changes at all with the glass composition and can be assumed to be a constant value of about 0.2. Thus, the glass according to Working Example A (as described below) has a specific thermal stress $\phi$=about 0.3 MPa/K, while $\phi$ for conventional soda-lime container glass ($\alpha=9.0 \cdot 10^{-6}$/K, E=70 GPa) is 0.78 MPa/K.

The specific thermal stress is a measure of the thermal shock resistance. With this low specific thermal stress, the glass has a sufficiently high thermal shock resistance for it to be eminently suitable for many purposes, including beverage container glass, particularly baby-milk bottles, coffee machine jugs and teapots, with the thermal shocks that occur in these applications.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patent and publications, cited above and below, and of corresponding German Application No. 199 13 227.5-27, filed Mar. 23, 1999, is hereby incorporated by reference.

EXAMPLES

Example 1

The Table depicts a glass from the composition range according to the invention (Working Example A) and a Comparative Example V, with the respective compositions (% by weight) and properties.

After the raw materials had been weighed out and mixed thoroughly, the glasses were melted in an electrically heated melting unit, which may be a conventional melter, at temperatures of up to 1620° C. (A) or 1650° C. (V).

TABLE

Composition (in % by weight) and properties of a working example (A) and a comparative example (V):

| | A | V |
|---|---|---|
| $SiO_2$ | 79.0 | 80.1 |
| $B_2O_3$ | 13.45 | 13.0 |
| $Al_2O_3$ | 2.4 | 2.5 |
| $Na_2O$ | 4.85 | 3.5 |
| $K_2O$ | — | 0.6 |
| NaCl | 0.3 | 0.3 |
| $\alpha_{20/300}$ [$10^{-6}$/K.] | 3.6 | 3.3 |
| Glass transition temperature $T_g$ [° C.] | 530 | 520 |
| $V_A$ [° C.] | 1205 | 1250 |
| T3 [° C.] | 1440 | 1530 |
| E [GPa] | 64 | 63 |
| H [class] | 1 | 1 |
| S [class] | 1 | 1 |
| L [class] | 2 | 2 |

The glass combines high chemical resistance and high thermal shock resistance, especially low thermal expansion, with good melting properties, especially a low working point. It is thus superior to borosilicate glasses 3.3 for applications which, although requiring a relatively high thermal shock resistance of the glasses, may not require the glasses to comply with DIN ISO 3585, because they can be produced at lower melting points and with higher melting capacities.

The fact that the glass preferably contains no additional components, can be a great advantage because it may be produced alternatively with the borosilicate glass 3.3 in the same production equipment, and only low remelting times occur. The increased productivity of the glass melting equipment with this glass reduces the production costs of manufacture for some products, particularly, thermal shock-resistant beverage containers that retain the quality of the properties relevant to this use.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A glass comprising in % by weight, based on oxide: $SiO_2$ about 78.5-about 79.5, $B_2O_3$ about 13.0-about 14.0, $Al_2O_3$ about 2.0-about 3.0, $Na_2O$ about 4.5-about 5.5, $K_2O$ 0-about 0.6, and optionally at least one fining agent; and $Er_2O_3$, CoO, or a combination thereof.

2. A process for making glass comprising melting together:

about 78.5 to about 79.5 weight percent based on oxide $SiO_2$;

about 13.0 to about 14.0 weight percent based on oxide $B_2O_3$;

about 2.0 to about 3.0 $Al_2O_3$ weight percent based on oxide; and about 4.5 to about 5.5 $Na_2O$ weight percent based on oxide; and $Er_2O_3$, CoO or a combination thereof.

3. A glass comprising in % by weight, based on oxide:

about 78.5 to about 79.5 $SiO_2$;

about 13.0 to about 14.0 $B_2O_3$;

about 2.0 to about 3.0 $Al_2O_3$;

about 4.5 to about 5.5 $Na_2O$; and $Er_2O_3$, CoO, or a combination thereof.

4. A glass according to claim 1, wherein the glass has a coefficient of linear thermal expansion $\alpha_{20/300}$ between about 3.5 and about $3.7 \cdot 10^{-6}$/K, a working point $V_A$ of ≦about 1220° C., and a modulus of elasticity of ≦about 65 GPa.

5. A glass according to claim 1, wherein the glass has a hydrolytic resistance in accordance with DIN ISO 719 in hydrolytic class 1, an acid resistance S in accordance with DIN 12 116 in acid class 1, and a caustic lye resistance L in accordance with DIN ISO 659 in lye class 2.

6. A glass according to claim 3, wherein the glass has a coefficient of linear thermal expansion $\alpha_{20/300}$ between about 3.5 and about $3.7 \cdot 10^{-6}$/K, a working point $V_A$ of ≦about 1220° C., and a modulus of elasticity of about 65 GPa.

7. A glass according to claim 3, wherein the glass has a hydrolytic resistance in accordance with DIN ISO 719 in hydrolytic class 1, an acid resistance S in accordance with DIN 12 116 in acid class 1, and a caustic lye resistance L in accordance with DIN ISO 659 in lye class 2.

8. A teapot, coffee machine jug or baby milk bottle comprising a glass according to claim 1.

9. A teapot, coffee machine jug or baby milk bottle comprising a glass according to claim 3.

10. A thermal shock-resistant container comprising the glass according to claim 1.

11. A thermal shock-resistant container comprising the glass according to claim 3.

12. A process according to claim 2 further comprising heating the oxides in a heated melting unit to no more than about 1620 degrees Celsius.

* * * * *

UNITED STATES PATENT AND TRADEMARK OFFICE

CERTIFICATE OF CORRECTION

PATENT NO. : 6,667,260 B2
DATED : December 23, 2003
INVENTOR(S) : Christian Kunert et al.

It is certified that error appears in the above-identified patent and that said Letters Patent is hereby corrected as shown below:

<u>Column 5,</u>
Line 19, "≦" (both occurrences) should read -- ≤ --.

<u>Column 6,</u>
Line 4, "≦" should read -- ≤ --.
Line 4, "of about 65" should read -- of ≤ about 65 --.

Signed and Sealed this

Twenty-sixth Day of April, 2005

JON W. DUDAS
*Director of the United States Patent and Trademark Office*